(12) United States Patent
Muchherla et al.

(10) Patent No.: US 12,461,818 B2
(45) Date of Patent: Nov. 4, 2025

(54) TEMPORARY PARITY BUFFER ALLOCATION FOR ZONES IN A PARITY GROUP

(71) Applicant: Micron Technology, Inc., Boise, ID (US)

(72) Inventors: Kishore Kumar Muchherla, Fremont, CA (US); David Scott Ebsen, Minnetonka, MN (US); Akira Goda, Tokyo (JP); Jonathan S. Parry, Boise, ID (US); Vivek Shivhare, Milpitas, CA (US); Suresh Rajgopal, San Diego, CA (US)

(73) Assignee: Micron Technology, Inc., Boise, ID (US)

( * ) Notice: Subject to any disclaimer, the term of this patent is extended or adjusted under 35 U.S.C. 154(b) by 93 days.

(21) Appl. No.: 18/483,091

(22) Filed: Oct. 9, 2023

(65) Prior Publication Data

US 2024/0118971 A1    Apr. 11, 2024

Related U.S. Application Data

(60) Provisional application No. 63/378,836, filed on Oct. 7, 2022.

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0656* (2013.01); *G06F 3/0659* (2013.01); *G06F 3/0683* (2013.01)

(58) Field of Classification Search
None
See application file for complete search history.

(56) References Cited

U.S. PATENT DOCUMENTS

2020/0012557 A1* 1/2020 Lee ................. G06F 3/0688
2020/0110661 A1* 4/2020 Singidi ............... G06F 3/061
2021/0124642 A1* 4/2021 Kim .............. G06F 11/1068
2022/0075545 A1* 3/2022 Agarwal ........... G06F 11/1004

FOREIGN PATENT DOCUMENTS

CN       112748870 A  *  5/2021  .......... G06F 11/1004
WO  WO-2015126518 A2  *  8/2015  .......... G06F 11/1471

\* cited by examiner

*Primary Examiner* — Guerrier Merant
(74) *Attorney, Agent, or Firm* — Nicholson De Vos Webster & Elliott LLP

(57) ABSTRACT

Methods, systems, and apparatuses include allocating a temporary parity buffer to a parity group. A write command is received that includes user data and is directed to a portion of memory included in a zone which is included in the parity group. A memory identifier is determined for the portion of memory. Parity group data is received from the temporary parity buffer using the memory identifier. Updated parity group data is determined using the parity group data and the user data. The updated parity group data is sent to the temporary parity buffer.

20 Claims, 7 Drawing Sheets

TEMPORARY PARITY BUFFER ALLOCATION FOR ZONES IN A PARITY GROUP

CROSS-REFERENCE TO RELATED APPLICATION

The present application claims the benefit of U.S. Provisional Patent Application No. 63/378,836 filed on Oct. 7, 2022, which is incorporated by reference herein in its entirety.

TECHNICAL FIELD

The present disclosure generally relates to temporary parity buffer allocation, and more specifically, relates to temporary parity buffer allocation for zones in a parity group.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to temporary parity buffer allocation for zones in a parity group in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

In conventional memory systems, there are defects introduced during manufacturing and during operation that may prevent a memory block from being properly programmed. When attempting to program a memory block containing defects, user data being written to the memory block can be lost when the programming fails. When writing to multiple memory blocks, parity data can be generated for the user data being written to the multiple memory blocks. The parity data allows recreating the user data from the memory blocks in the event of a program failure. Hosts may write to different memory blocks at different frequencies and the memory blocks therefore have different fill frequencies. Because the parity data is generated as the memory blocks are filled, generating parity data for memory blocks with different fill frequencies is extremely inefficient.

Aspects of the present disclosure address the above and other deficiencies by allocating temporary parity buffer space for memory blocks in a parity group. The temporary parity buffer is allocated for zones in the parity group before the zones are written. Whenever a new portion of a memory block in the parity group is written to, the parity buffer is updated to reflect the change. The parity data is therefore maintained as blocks are written at different frequencies. The temporary parity buffer also maintains capacity for the unwritten portions of memory. By allocating the temporary parity buffer to both written and unwritten portions of memory, a memory subsystem can efficiently update the temporary parity buffer as data is written to each parity group. Furthermore, by using temporary parity data, a memory subsystem can efficiently allocate memory blocks to the parity group, replacing memory blocks that have been fully programmed.

Figure 1:
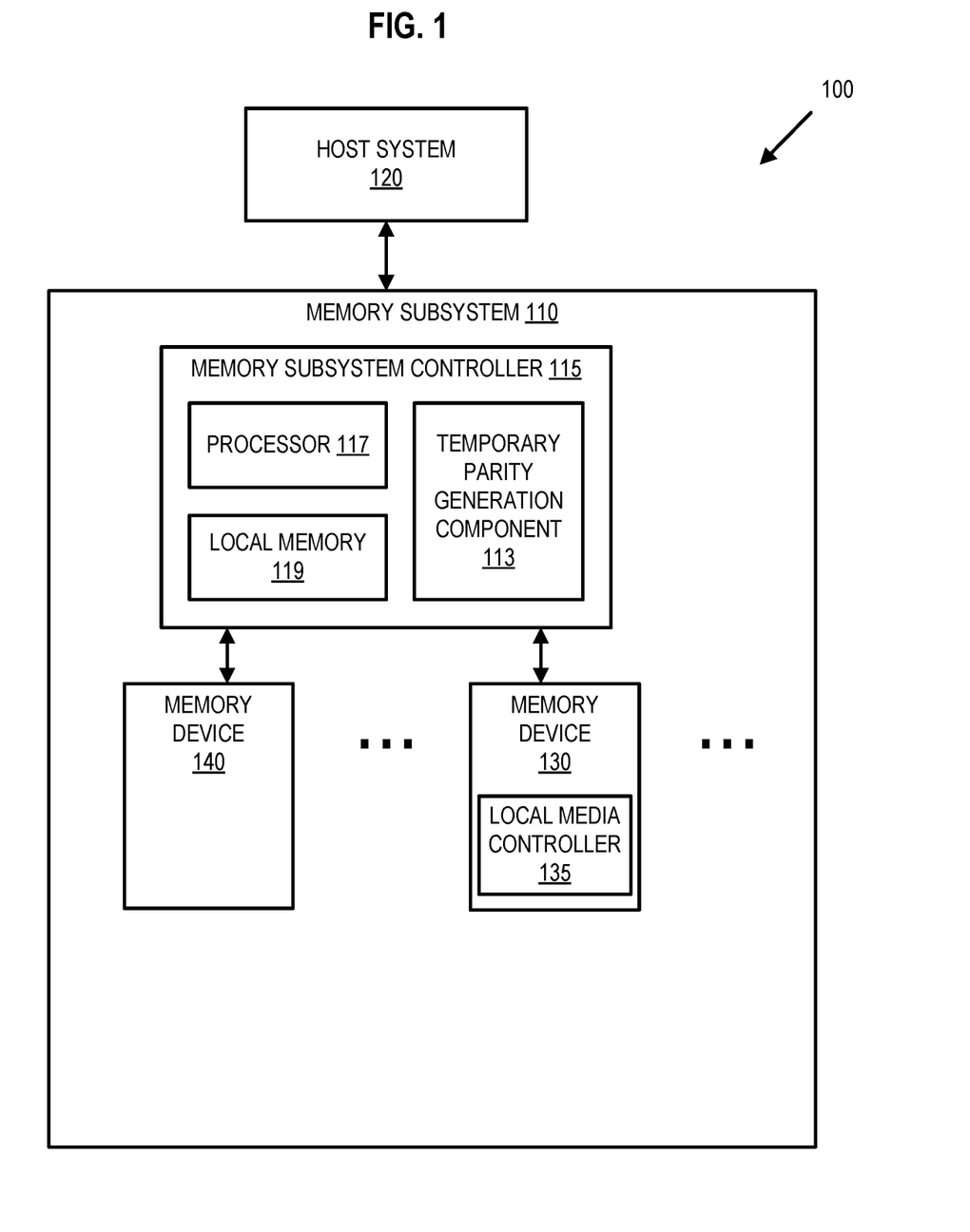
FIG. 1 illustrates an example computing system that includes a memory subsystem in accordance with some embodiments of the present disclosure.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes temporary parity generation component 113 that can allocate a temporary parity buffer for multiple zones in a parity group with differences fill frequencies. In some embodiments, the controller 115 includes at least a portion of the temporary parity generation component 113. For example, the controller 115 can include a processor 117 (processing device) configured to execute instructions stored in local memory 119 for performing the operations described herein. In some embodiments, a temporary parity generation component 113 is part of the host system 120, an application, or an operating system.

The temporary parity generation component 113 can allocate a temporary parity buffer for zones in a parity group with different fill frequencies as the zones are filled and generates a parity map to track which zones have been filled. Further details with regards to the operations of the temporary parity generation component 113 are described below.

Figure 2:
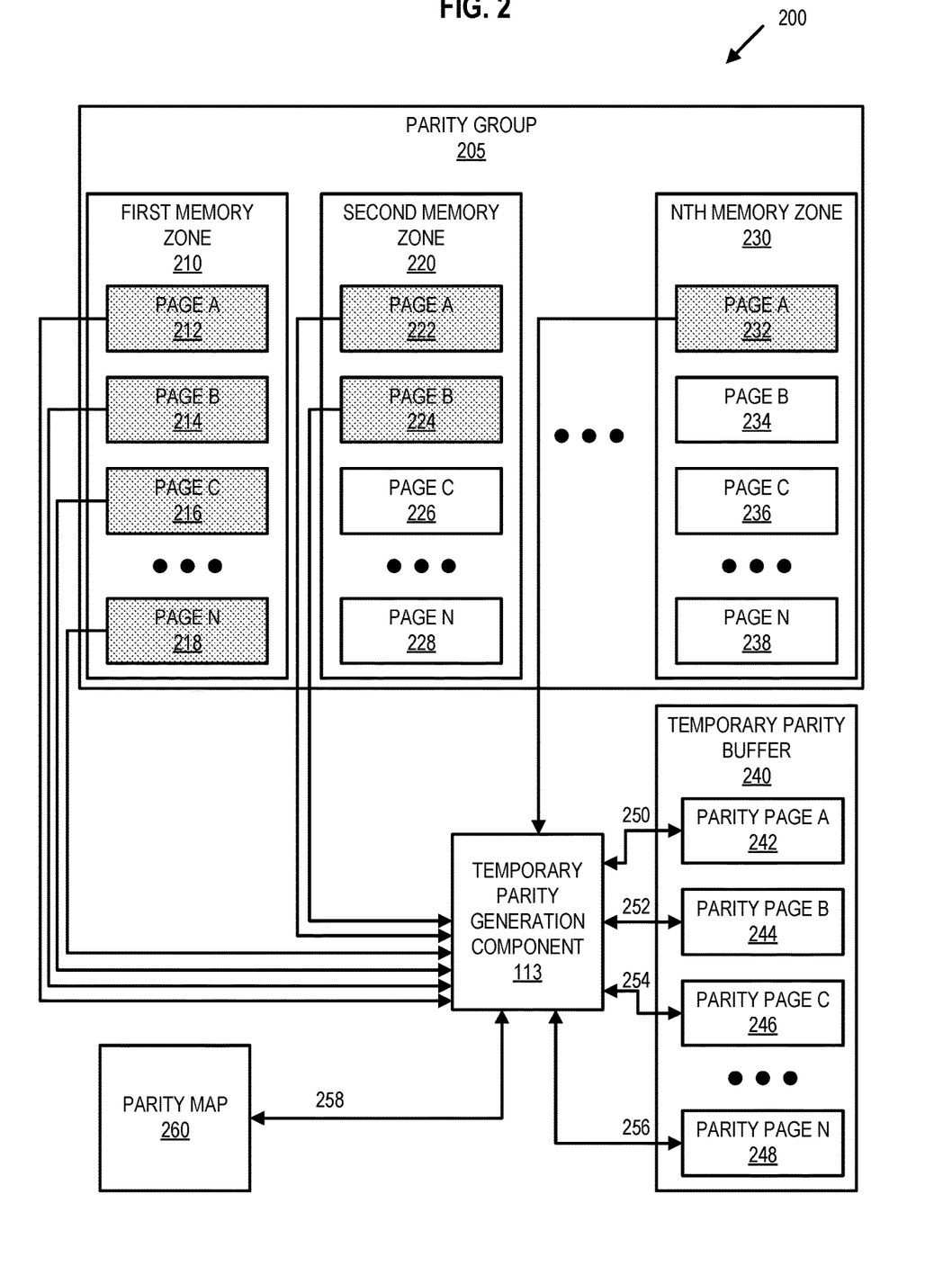
FIG. 2 illustrates temporary parity buffer allocation for zones in a parity group in accordance with some embodiments of the present disclosure.

FIG. 2 illustrates temporary parity buffer allocation for zones in a parity group in accordance with some embodiments of the present disclosure. Temporary parity generation system 200 includes parity group 205. Parity group 205 includes first memory zone 210 and second memory zone 220 through Nth memory zone 230. First memory zone 210 includes pages A through N 212, 214, 216, and 218, second memory zone 220 includes pages A through N 222, 224, 226, and 228, and Nth memory zone 230 includes pages A through N 232, 234, 236, and 238. Parity group 205 and, therefore, first memory zone 210 through Nth memory zone 230, is stored in a memory device, such as memory device 140 of FIG. 1. In some embodiments, different memory zones are stored in different memory devices. The memory zones (first memory zone 210 through Nth memory zone 230) are identified as belonging parity group 205 through a zone mapping table or another data structure storing information on which zones belong to parity group 205. In some embodiments, the zone mapping table or other data structure also stores information on the location of the zones within parity group 205 (e.g., identifying first memory zone 210 in a first zone position in parity group 205). In some embodiments, the zone mapping table is stored in a memory device, such as memory device 140. In other embodiments, the zone mapping table is stored in local memory, such as local memory 119 of FIG. 1. The number of memory zones within parity group 205 can vary depending on the requirements and capabilities of the memory system. In some embodiments, parity group 205 is part of a redundant array of independent nodes (RAIN) implementation. In such embodiments, parity group 205 may be a RAIN stripe. In some embodiments, parity group 205 is instead a RAIN stripe subgroup and multiple parity groups are included in the larger RAIN stripe.

In some embodiments, each of memory zones 210 through 230 are zones in a zone namespace (ZNS) architecture. Each of memory zones 210 through 230 can include one or more physical memory blocks. In one embodiment, each of memory zones 210 through 230 include one or two physical memory blocks. Different memory zones can each include a different number of physical blocks and therefore a different number of pages. For example, first memory zone 210 may include 5000 pages whereas second memory zone 220 may only include 2500 pages. Furthermore, each of memory zones 210 through 230 can have a different fill frequency. For example, even though the actual write rate when writing data to each of the memory zones may be the same, the frequency at which the different memory zones are written (i.e., fill frequency) is different such that each of memory zones 210 through 230 can fill at a different rate. In some embodiments, memory zones 210 through 230 are composed of QLCs.

Temporary parity buffer 240 is allocated to and buffers parity data for parity group 205. In some embodiments, temporary parity buffer 240 is stored in local memory, such as local memory 119 of FIG. 1. In other embodiments, temporary parity buffer 240 is stored in a memory device, such as memory device 140 of FIG. 1. In still other embodiments, temporary parity buffer 240 is stored in part in a local memory and in part in a memory device. In some embodiments, temporary parity buffer 240 is a RAIN buffer that is the same size as the largest memory zone in parity group 205.

Each of parity page A 242, parity page B 244, and parity pages C 246 through N 248 hold parity data for the associated pages in memory zones 210 through 230. For example, parity page A 242 holds parity data for page A 212, page A 222, and page A 232 (as well as page A in other memory zones in parity group 205). Since temporary parity buffer 240 may have a larger storage capacity and larger number of written pages than at least some of the memory zones in parity group 205, not every page of temporary parity buffer 240 has parity data for all memory zones in parity group 205. For example, first memory zone 210 and Nth memory zone 230 may each include 5000 pages whereas second memory zone 220 includes only 2500 pages. Temporary parity buffer 240 would therefore include 5000 pages and pages 2501 through 5000 of temporary parity buffer 240 would not include parity data for second memory zone 220. Additionally, each of parity page A 242, parity page B 244, and parity pages C 246 through N 248 are also allocated for unwritten pages in memory zones 210 through 230. Continuing the example above, temporary parity buffer 240 contains 5000 pages even when less than all 5000 pages of first memory zone 210 and/or Nth memory zone 230 are written.

In some embodiments, temporary parity buffer 240 is a page-addressable memory buffer. In some embodiments, temporary parity buffer 240 is a non-volatile memory buffer. For example, temporary parity buffer 240 may be an SLC buffer, SRAM buffer, DRAM buffer, phase-change memory buffer, NOR flash memory buffer, Optane™ memory buffer, 3-D cross point buffer, or combinations of these.

Parity map 260 is a memory structure that maps parity group 205 to temporary parity buffer 240. In some embodiments, parity map 260 is stored in local memory, such as local memory 119 of FIG. 1. In other embodiments, parity map 260 is stored in a memory device, such as memory device 140 of FIG. 1. In still other embodiments, parity map 260 is stored in temporary parity generation component 113. Parity map 260 includes information on which pages of which memory zones have parity data included in temporary parity buffer 240. In some embodiments, parity map 260 is a bitmap that has a first dimension equal to the number of memory zones and a second dimension equal to the number of pages in the largest memory zone (i.e., the number of pages in temporary parity buffer 240). In such an embodiment, parity map 260 includes a bit for each page of each memory zone in parity group 205. If a bit in parity map 260 is set to one value (e.g., "1"), the mapped page in the mapped memory zone has parity data included in temporary parity buffer 240. Conversely, if a bit in parity map 260 is set to another value (e.g., "0"), the mapped page in the mapped memory zone does not have parity data included in temporary parity buffer 240. In some embodiments, temporary parity generation component 113 does not use parity map 260 or parity map data 258 and instead keeps track of the last written page in each of the memory zones 210 through 230. For example, temporary parity generation component 113 uses a page pointer or a block cursor to track which pages have been written in each of memory zones 210 through 230 and, therefore, which pages have representative parity data in temporary parity buffer 240.

Temporary parity generation component 113 receives pages of memory zones that have been written, e.g., to one or more memory devices 130. Temporary parity component 113 may receive a different number of pages from each memory zone because each memory zone may have a different fill frequency and therefore a different number of written pages. For example, as shown in FIG. 2 with shading of blocks representing written pages, temporary parity generation component 113 receives page A 212, page B 214, and pages C 216 through N 218 from first memory zone 210. Although any number of memory zones may be used, for the sake of simplicity, the examples only explicitly include first memory zone 210, second memory zone 220, and Nth memory zone 230. Temporary parity generation component 113 receives only page A 222 and page B 224 from second memory zone 220. Temporary parity generation component 113 only receives page A 222 from Nth memory zone 230. Temporary parity generation component 113 performs an operation on the received pages and generates parity page A data 250, parity page B data 252, and parity pages C data 254 through parity page N data 256. For example, temporary parity generation component 113 performs an exclusive-or operation on written pages A in parity group 205, including page A 212, page A 222, and page A 232, to generate parity page A data 250. Temporary parity generation component 113 then stores parity page A data 250 in parity page A 242 of temporary parity buffer 240. Temporary parity generation component 113 also performs an exclusive-or operation on written pages B in parity group 205, including page B 214 and page B 224, to generate parity page B data 252. Temporary parity generation component 113 then stores parity page B data 252 in parity page B 244 of temporary parity buffer 240. Because the only pages C through N that have been written are pages C 216 through N 218 of first memory zone 210, temporary parity generation component 113 generates parity page C data 254 through parity page N data 256 and stores parity page C data 254 through parity page N data 256 in parity pages C 246 through N 248 of temporary parity buffer 240. In some embodiments, when parity page data is generated for a single zone (e.g., parity page C data 254 through parity page N data 256), temporary parity generation component 113 writes the pages of that zone into the parity pages of temporary parity buffer 240. For example, temporary parity generation component 113 writes pages C 216 through N 218 to parity pages C 246 through N 248 respectively when none of the other zones include data for pages C through N.

Temporary parity generation component 113 also sends parity map data 258 to parity map 260 to reflect that parity information for page A 212, page B 214, pages C 216 through N 218, page A 222, page B 224, and page A 232 are stored in temporary parity buffer 240. For example, in embodiments where parity map 260 is a bitmap, parity map data 258 is data indicating that the portions of the parity map 260 memory structure mapped to page A 212, page B 214, pages C 216 through N 218, page A 222, page B 224, and page A 232 should be rewritten as is (or another indication of being included in the parity page). In some embodiments, temporary parity generation component 113 sends parity map data 258 to parity map 260 as parity pages are written to temporary parity buffer 240 (e.g., after each of the parity pages in written).

In some embodiments, temporary parity generation component 113 receives the pages of memory zones as they are written to the memory zones, generates parity page data, and stores the parity page data in the parity pages of temporary parity buffer 240. For example, in response to page A 212 being written, temporary parity generation component 113 generates parity page A data 250 using only page A 213 and stores parity page A data 250 in parity page A 242. In response to page A 222 being written next, temporary parity generation component A13 retrieves the parity page A data 250 stored in parity page A 242 (i.e., representing only page A 212) and performs an exclusive-or operation using the retrieved parity page A data 250 and the data in page A 222 to update parity page A data 250 which temporary parity generation component 113 stores in parity page A 242. In response to page A 232 being written next, temporary parity generation component 113 again retrieves parity page A data 250 stored in parity page A 242 (i.e., representing only page A 212 and page A 222) and, using parity page A data 250 and the data in page A 222, updates parity page A data 250 which temporary parity generation component 113 stores in parity page A 242. In such embodiments, temporary parity generation component 113 sends parity map data 258 to parity map 260 to update parity map 260 after each time temporary parity generation component 113 writes to temporary parity buffer 240. In other embodiments, temporary parity generation component 113 generates parity page data and parity map data after a batch of page writes.

In some embodiments, temporary parity generation component 113 detects a power down (e.g., a synchronous power loss or asynchronous power loss event) and stores the information in temporary parity buffer 240 and parity map 260 in non-volatile memory. For example, in embodiments where temporary parity buffer 240, parity map 260, or both are stored in volatile memory elements, temporary parity generation component 113 receives the data stored in temporary parity buffer 240 and parity map 260 and writes the data into a non-volatile memory element, such as an SLC buffer.

In some embodiments, temporary parity buffer 240 is composed of two or more different types of memory elements. For example, temporary parity generation component 113 determines that there is not sufficient space in a given memory buffer composed of a first memory element (e.g., page-addressable memory buffer) and allocates a second memory buffer composed of a second memory element (e.g., non-volatile SLC memory blocks) to temporary parity buffer 240. In some embodiments, temporary parity generation component 113 stores memory zones with lower fill frequencies in slower memory elements. For example, temporary parity generation component 113 stores the memory zones with highest fill frequencies in the first memory element (e.g., page-addressable memory buffer such as DRAM) and stores memory zones with the lowest fill frequencies in the second memory element (e.g., non-volatile SLC memory blocks)

Figure 3:
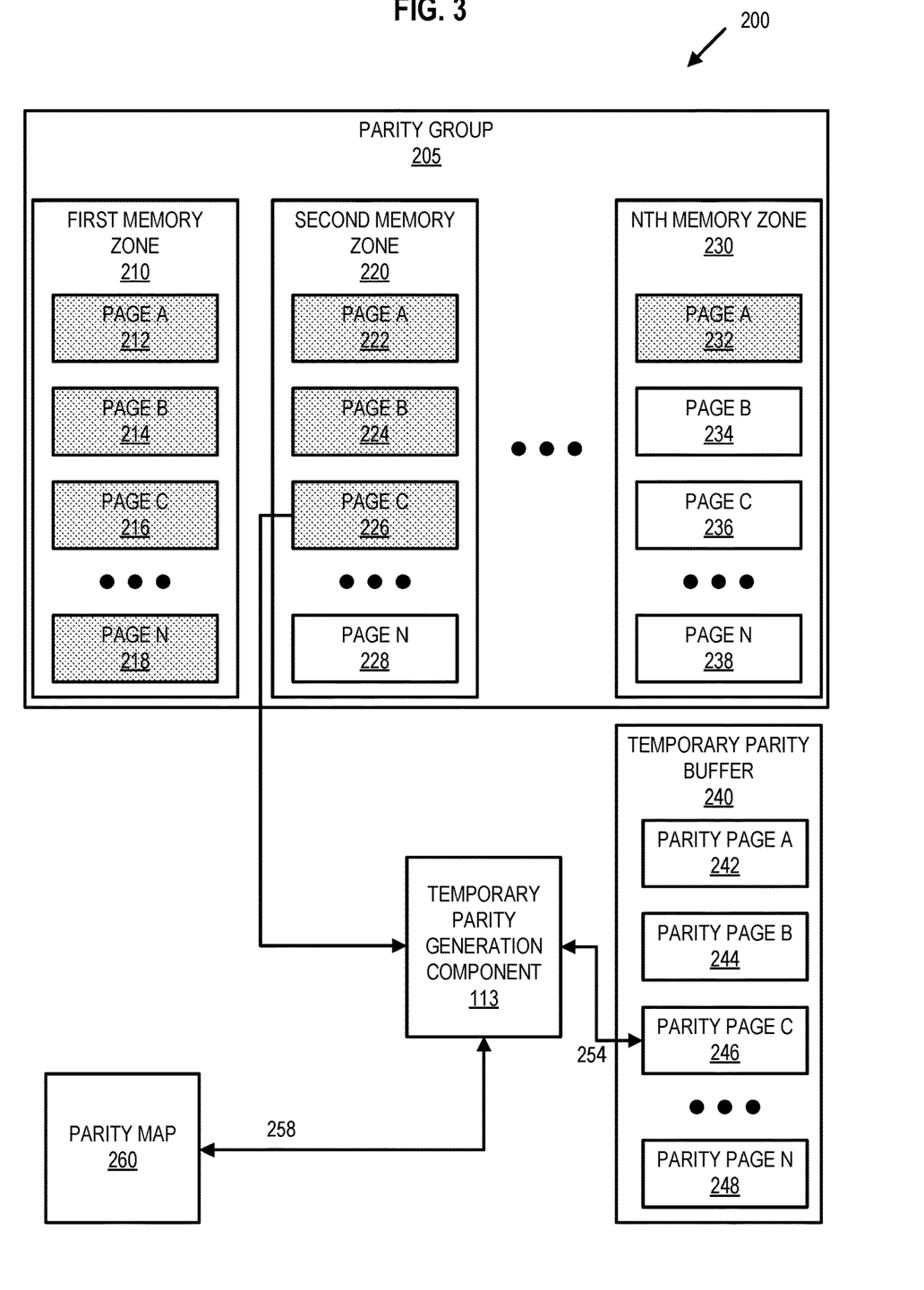
FIG. 3 illustrates temporary parity buffer allocation for zones in a parity group in accordance with some embodiments of the present disclosure.

FIG. 3 illustrates temporary parity buffer allocation for zones in a parity group in accordance with some embodiments of the present disclosure. As shown with the addition of shading to page C 226, temporary parity generation component 113 updates parity page C data 254 in response to page C 226 being written. For example, temporary parity generation component 113 receives page C 226 from second memory zone 220, retrieves parity page C data 254 from parity page C 246, and performs an exclusive-or operation on page C 226 and parity page C data 254 to update parity page C data 254. Temporary parity generation component 113 determines which page to retrieve from temporary parity buffer 240 based on the received page C 226. For example, temporary parity generation component 113 uses the page number or a memory identifier to determine which page to retrieve from temporary parity buffer 240. Temporary parity generation component 113 stores parity page C data 254 in parity page C 246. Temporary parity generation component 113 retrieves parity map data 258 from parity map 260 and updates parity map data 258 indicating parity data for page C 226 has been stored in temporary parity buffer 240. Temporary parity generation component 113 sends parity map data 258 to parity map 260.

Figure 4:
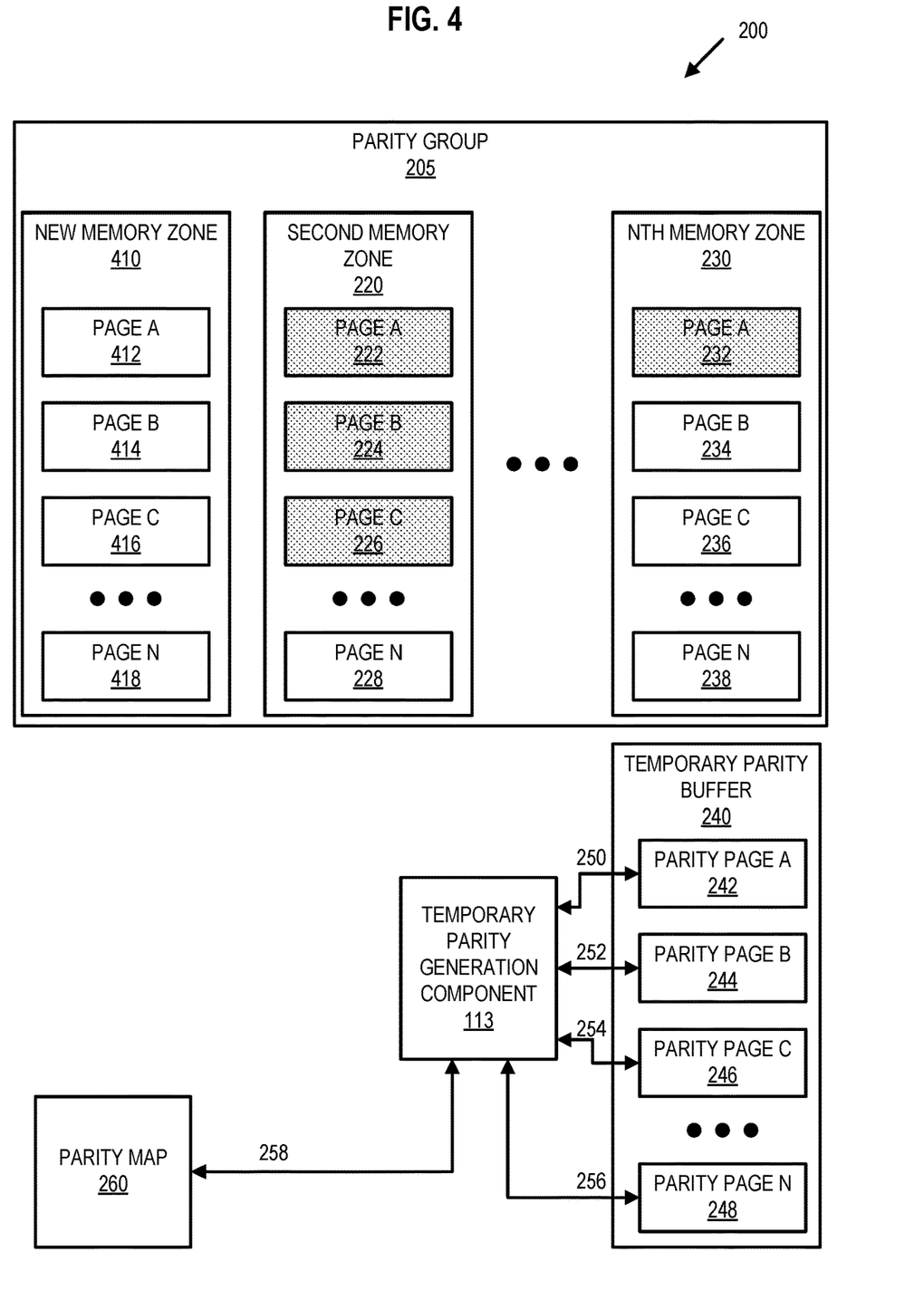
FIG. 4 illustrates temporary parity buffer allocation for zones in a parity group in accordance with some embodiments of the present disclosure.

FIG. 4 illustrates temporary parity buffer allocation for zones in a parity group in accordance with some embodiments of the present disclosure. FIG. 4 illustrates temporary parity generation system 200 when first memory zone 210 is replaced by new memory zone 410 including pages A through N 412, 414, 416, and 418. For example, temporary parity generation component 113 determines that first memory zone 210 of FIGS. 2 and 3 is full. In some embodiments, when the memory zones are composed of QLCs or another memory type requiring multiple pass programming, temporary parity generation component 113 determines that a memory zone is full when the memory zone has undergone a final pass of programming. In some embodiments, temporary parity generation component 113 determines that a memory zone is full in response to the fullness of the zone satisfying a threshold fullness. For example, temporary parity generation component 113 determines that the first memory zone is full in response to the zone having 100% of pages written. As a result of determining that a memory zone is full, temporary parity generation component 113 determines that the parity data for the full memory zone is no longer needed. In some embodiments, the memory subsystem 110 generates and stores permanent parity data for the full memory zone.

In some embodiments, in response to fully programming a memory zone, temporary parity generation component 113 uses temporary parity buffer 240 to verify correct programming. Temporary parity generation component 113 generates parity data for each of the pages in the filled memory zone and compares this parity data to the parity data stored in temporary parity buffer 240 using parity map 260. For example, temporary parity generation component 113 performs an exclusive-or operation on each set of pages (e.g., page A of all memory zones, etc.) for every memory zone with parity data included in temporary parity buffer 240. Temporary parity generation component 113 compares the result of this operation with parity pages A through N 242, 244, 246, and 248. If the operation result is the same as the stored parity information, the memory zone is correctly programmed. If the operation result is different from the stored parity information, however, the memory zone is not correctly programmed.

In response to successfully verifying that the memory zone has been correctly programmed, temporary parity generation component 113 updates parity group 205. For example, temporary parity generation component 113 updates parity group 205 to remove first memory zone 210 and adds new memory zone 410 in its place. In some embodiments, temporary parity generation component 113 updates parity group 205 information by updating a zone mapping table, mapping new memory zone 410 to the first zone of parity group 205. In response to successfully verifying that the memory zone has been correctly programmed, temporary parity generation component 113 also receives and updates parity page A data 250, parity page B data 252, and parity page C data 254 through parity page N data 256 data in parity page A 242, parity page B 244, and parity pages C 246 through N 248 respectively. For example, temporary parity generation component 113 performs an exclusive-or operation for each of the sets of page A 212 and parity page A 242, page B 214 and parity page B 244, and pages C 216 through N 218 and parity pages C 246 through N 248 respectively. Through this exclusive-or operation, temporary parity generation component clears the parity data stored in temporary parity buffer 240 relating to first memory zone 210. Temporary parity generation component 113 also sends parity map data 258 to parity map 260 to update parity map 260. For example, in embodiments where parity map 260 is a bitmap, temporary parity generation component 113 rewrites all the bits mapped to first memory zone 210 as 0s.

Figure 5:
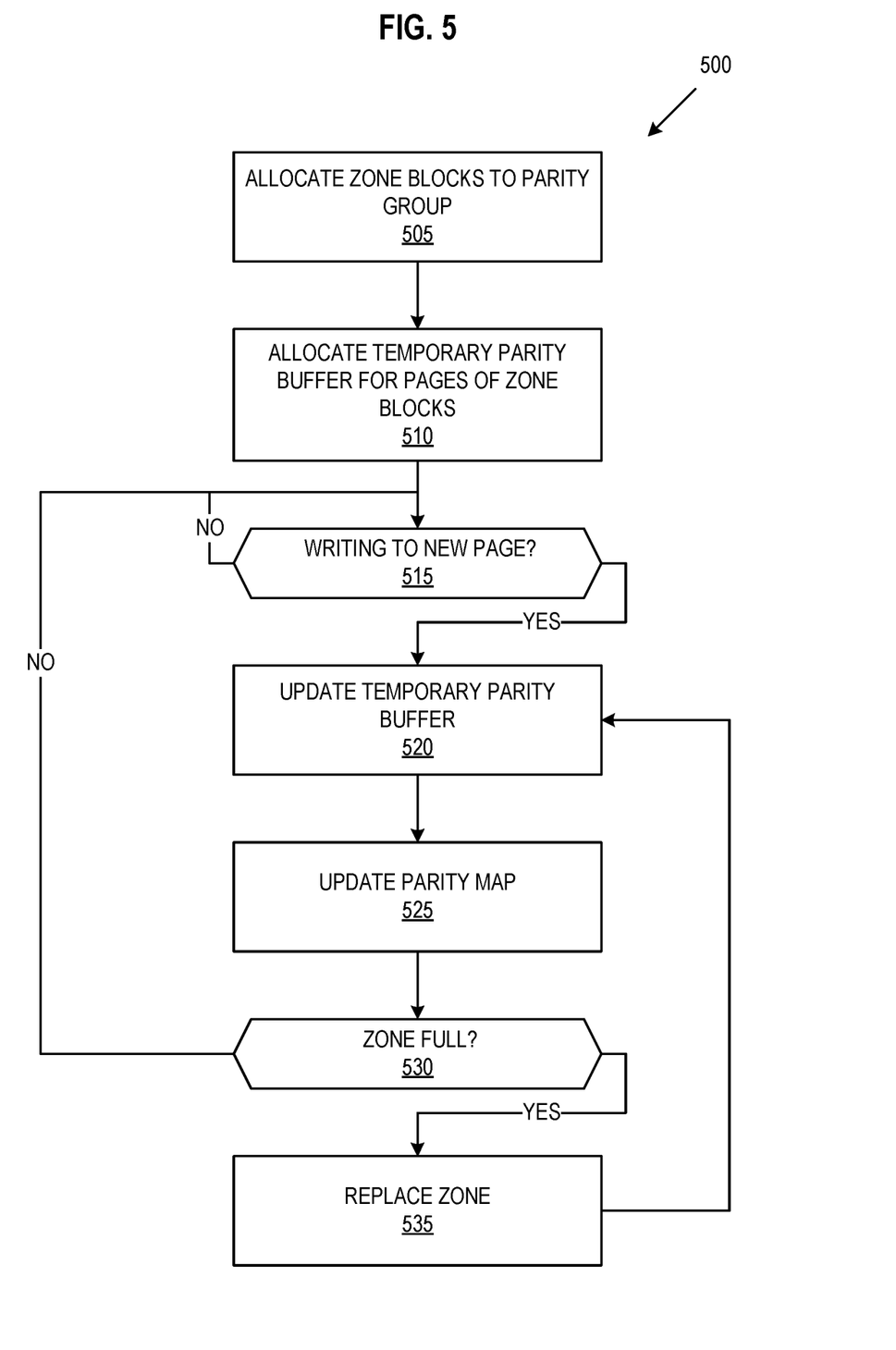
FIG. 5 is a flow diagram of an example method to allocate a temporary parity buffer for zones in a parity group in accordance with some embodiments of the present disclosure.

FIG. 5 is a flow diagram of an example method 500 to allocate a temporary parity buffer for zones in a parity group, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the temporary parity generation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device allocates zone blocks to a parity group. For example, temporary parity generation component 113 determines which zones are included in a parity group. In some embodiments, the parity group is a RAIN stripe. In other embodiments, the parity group is a subdivision of a RAIN stripe. In some embodiments, temporary parity generation component 113 determines which zones are included in a parity group based on the fill frequencies of the zones. For example, temporary parity generation component 113 groups zones with similar fill frequencies.

At operation 510, the processing device allocates a temporary parity buffer for pages of the zone blocks. For example, temporary parity generation component 113 allocates a buffer, such as temporary parity buffer 240 of FIGS. 2, 3, and 4, to the parity group. The buffer is the same size as the largest zone in the parity group. The buffer is allocated for both written and unwritten pages in each zone of the parity group. In some embodiments, the processing device allocates a buffer composed of two or more different types of memory elements. For example, temporary parity generation component 113 determines that there is not sufficient space in a given memory buffer composed of a first memory element (e.g., page-addressable memory buffer) and therefore also allocates a second memory buffer composed of a second memory element (e.g., non-volatile SLC memory blocks). In some embodiments, the processing device stores memory zones with lower fill frequencies in slower memory elements. For example, temporary parity generation component 113 stores the memory zones with highest fill frequencies in the first memory element (e.g., page-addressable memory buffer such as DRAM) and stores memory zones with the lowest fill frequencies in the second memory element (e.g., non-volatile SLC memory blocks). In some embodiments, the processing device uses buffers of different memory types during different portions of the parity data generation and storage. For example, temporary parity generation component 113 uses a DRAM buffer to store the parity data. When updating parity data, temporary parity generation component 113 retrieves the parity data from the DRAM buffer, loads it into an SRAM buffer where the parity data is updated, and then stores the updated parity data in the DRAM buffer.

At operation 515, the processing device determines whether a new page in the zone blocks is being written. For example, temporary parity generation component 113 determines that a host device, such as host system 120 of FIG. 1, is writing to one of the memory zones allocated to the parity group. In some embodiments, temporary parity generation determines that a page of one or the memory zones has been written or is being written. If the processing device determines that there is not a page in one of the memory zones being written, the method 500 repeats operation 515. If the processing device determines that there is a page in one of the memory zones being written, the method 500 proceeds to operation 520.

At operation 520, the processing device updates the temporary parity buffer. For example, temporary parity generation component 113 generates parity data using the user data written to the new page. In some embodiments, if there is parity data stored for pages in other zones that is associated with the new page, the processing device retrieves the parity data and updates the parity data using the user data written to the new page. For example, temporary parity generation component 113 retrieves parity data from temporary parity buffer and performs an exclusive-or operation on the retrieved parity data and the user data to determine updated parity data. If the processing device updates the temporary parity buffer in response to replacing a zone (e.g., executing operation 535), the processing device updates the temporary parity buffer to remove the parity data for the zone that is replaced. For example, temporary parity generation component 113 performs and exclusive-or operation using the data stored in the pages of the zone to be replaced and the data stored in the temporary parity buffer.

At operation 525, the processing device updates the parity map. For example, temporary parity generation component 113 updates a parity map which maps the pages and zones of the parity group with parity data stored in temporary parity buffer. In some embodiments, the parity map is a bitmap with each page of each memory zone represented by a bit indicating whether the page has parity data stored in temporary parity buffer. In such embodiments, temporary parity generation component 113 rewrites the bitmap with a 1 for a page that has been written and rewrites the bitmap with a 0 for a page that has been erased or replaced.

At operation 530, the processing device determines whether the zone is full. For example, temporary parity generation component 113 determines that a memory zone is full when every page of the zone has undergone a final pass of programming. In some embodiments, the processing device determines that a memory zone is full in response to the fullness of the zone satisfying a threshold fullness. For example, temporary parity generation component 113 determines that the first memory zone is full in response to the zone having 100% of pages written. If the processing device determines that the zone is full, the method 500 proceeds to operation 535. If the processing device determines that the zone is not full, the method 500 proceeds to operation 515.

At operation 535, the processing device replaces the zone. For example, temporary parity generation component 113 updates the parity group to remove the full memory zone and replace it with a new memory zone. In some embodiments, temporary parity generation component 113 updates the parity group by updating a zone mapping table, mapping the new memory zone to the first zone of the parity group.

Figure 6:
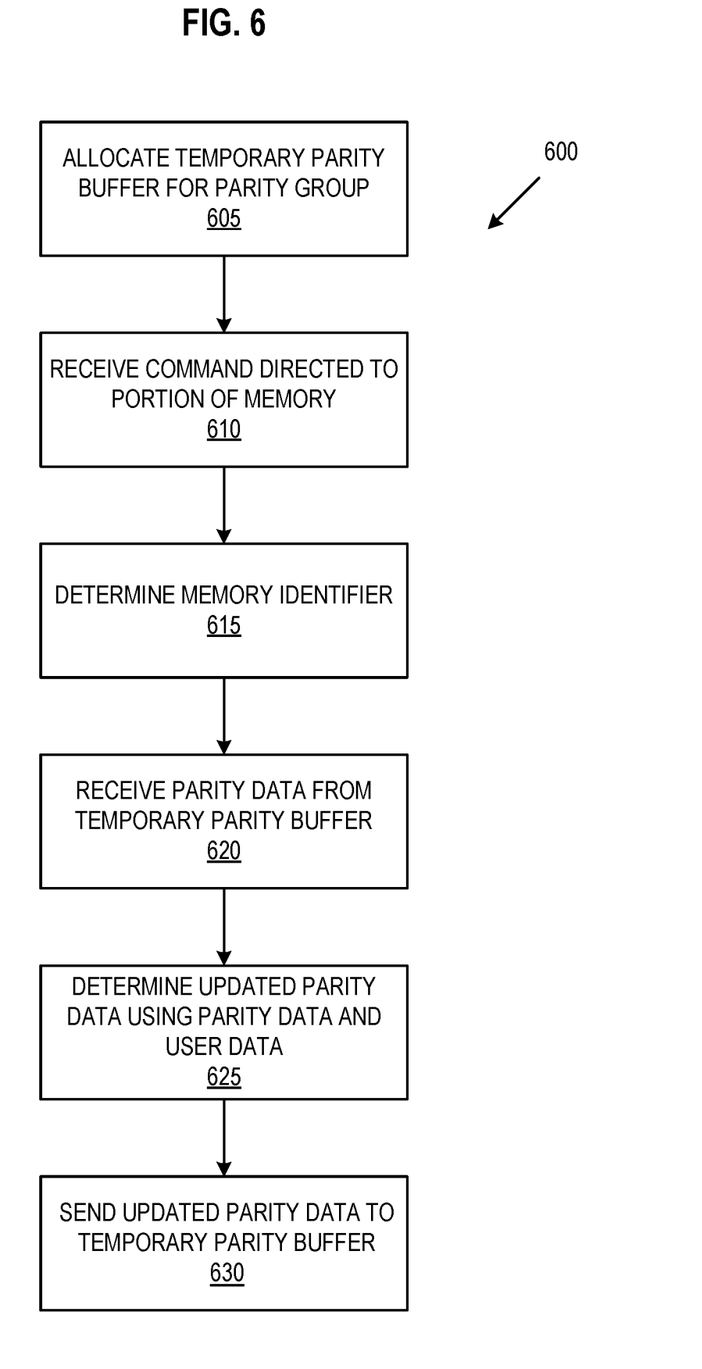
FIG. 6 is another flow diagram of an example method to allocate a temporary parity buffer for zones in a parity group in accordance with some embodiments of the present disclosure.

FIG. 6 is a flow diagram of an example method 600 to allocate a temporary parity buffer for zones in a parity group, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the temporary parity generation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing device allocates a temporary parity buffer for the parity group. For example, temporary parity generation component 113 allocates a buffer, such as temporary parity buffer 240 of FIGS. 2, 3, and 4, to the parity group. The buffer is the same size as the largest zone in the parity group. The buffer is allocated for both written and unwritten pages in each zone of the parity group.

At operation 610, the processing device receives a command directed to a portion of memory. For example, temporary parity generation component 113 receives a write command from a host device, such as host system 120 of FIG. 1 with user data and a logical address. The processing device translates the logical address to a physical address and determines where to write the user data based on the physical address.

At operation 615, the processing device determines a memory identifier using the portion of memory. For example, temporary parity generation component 113 determines which page to retrieve from a temporary parity buffer, such as temporary parity buffer 240 of FIGS. 2, 3, and 4, based on the portion of memory identified in the received write command. In some embodiments, temporary parity generation component 113 uses the page number of the memory zone targeted by the write command to determine which page to retrieve from the temporary parity buffer.

At operation 620, the processing device receives parity data from a temporary parity buffer. For example, temporary parity generation component 113 receives parity data for a parity group from a temporary parity buffer, such as temporary parity buffer 240 of FIGS. 2, 3, and 4. In some embodiments, the parity data is parity data for a specific page or portion of memory.

At operation 625, the processing device determines updated parity data using the parity data and the user data. For example, temporary parity generation component 113 determines updated parity data using the user data in the received command and the parity data retrieved from the parity buffer.

At operation 630, the processing device sends updated parity data to temporary parity buffer. For example, temporary parity generation component 113 sends the updated parity data to a temporary parity buffer, such as temporary parity buffer 240 of FIGS. 2, 3, and 4.

Figure 7:
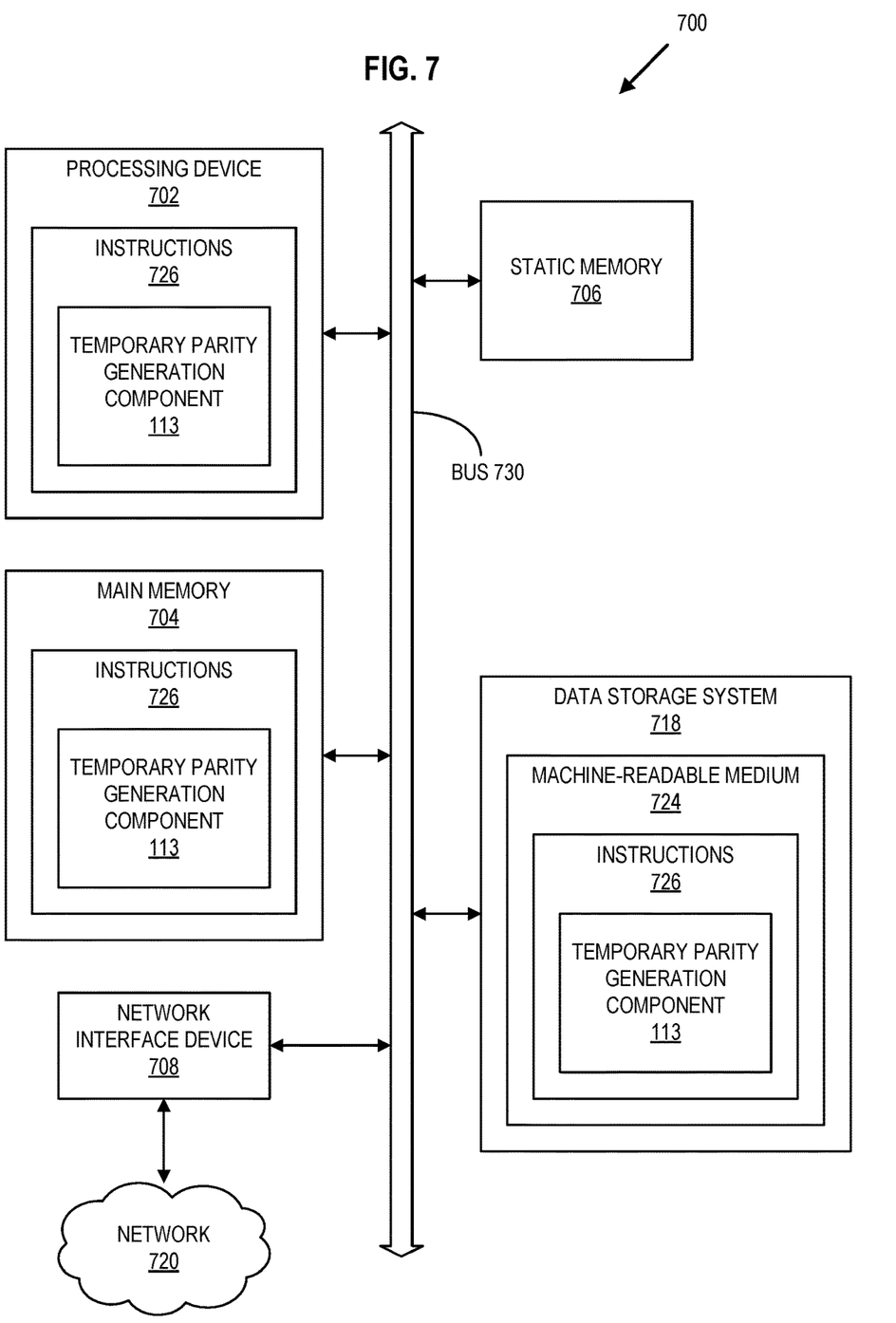
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the temporary parity generation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory subsystem 110 of FIG. 1.

In one embodiment, the instructions 726 include instructions to implement functionality corresponding to a temporary parity generation component (e.g., the temporary parity generation component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium"

shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 500 and 600 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    allocating a temporary parity buffer to a parity group, wherein the temporary parity buffer is allocated for written and unwritten portions of memory in the parity group;
    receiving a write command, wherein the write command includes user data and is directed to a portion of memory, wherein the portion of memory is included in a zone which is included in the parity group comprising a plurality of zones and each of the plurality of zones comprises a plurality of portions of memory, and wherein a first zone of the plurality of zones has a first write rate and a first fill frequency, a second zone of the plurality of zones has a second write rate that is the same as the first write rate and a second fill frequency that is different from the first fill frequency;
    determining a memory identifier for the portion of memory;
    receiving parity group data from the temporary parity buffer using the memory identifier, wherein the parity group data includes parity data for portions of memory of the plurality of zones identified by the memory identifier;
    determining updated parity group data using the parity group data and the user data; and
    sending the updated parity group data to the temporary parity buffer.

2. The method of claim 1, wherein the plurality of portions of memory include written and unwritten portions of memory.

3. The method of claim 1, wherein determining the memory identifier includes retrieving parity map data, wherein the parity map data indicates programmed portions of memory for each of the plurality of zones in the parity group, and wherein the method further comprises:
    determining updated parity map data using the parity map data, the zone, and the memory identifier; and
    storing the updated parity map data.

4. The method of claim 1, further comprising:
    determining whether a fullness of the zone satisfies a threshold fullness; and
    in response to determining the fullness satisfies the threshold fullness:
        replacing the zone with a replacement zone;
        determining replacement parity group data using the updated parity group data and the zone, wherein the replacement parity group data does not include parity data for the zone; and
        sending the replacement parity data to the temporary parity buffer.

5. The method of claim 4, wherein determining the replacement parity group data comprises:

generating zone parity data for all data stored in the zone; and generating the replacement parity group data by removing the zone parity data from the updated parity group data.

6. The method of claim 1, wherein determining the updated parity group data comprises performing an exclusive-or operation using the parity group data and the user data.

7. The method of claim 1, wherein the temporary parity buffer is a volatile memory element, the method further comprising:

detecting a power loss event; and storing the temporary parity buffer in a non-volatile memory element in response to detecting the power loss event.

8. The method of claim 1, wherein the temporary parity buffer comprises a first type of memory element and a second type of memory element, the method further comprising:

determining a fill frequency for each zone in the plurality of zones;

determining a first set of zones and a second set of zones of the plurality of zones using the fill frequency;

allocating the first type of memory element to the first set of zones; and allocating the second type of memory element to the second set of zones.

9. A non-transitory computer-readable storage medium comprising instructions that, when executed by a processing device, cause the processing device to:

allocate a temporary parity buffer to a parity group, wherein the temporary parity buffer is allocated for written and unwritten portions of memory in the parity group;

receive a write command, wherein the write command includes user data and is directed to a portion of memory, wherein the portion of memory is included in a zone which is included in the parity group comprising a plurality of zones and each of the plurality of zones comprises a plurality of portions of memory, and wherein a first zone of the plurality of zones has a first write rate and a first fill frequency, a second zone of the plurality of zones has a second write rate that is the same as the first write rate and a second fill frequency that is different from the first fill frequency;

determine a memory identifier for the portion of memory;

receive parity group data from the temporary parity buffer using the memory identifier, wherein the parity group data includes parity data for portions of memory of the plurality of zones identified by the memory identifier, wherein the portions of memory include written and unwritten portions of memory;

determine updated parity group data using the parity group data and the user data; and send the updated parity group data to the temporary parity buffer.

10. The non-transitory computer-readable storage medium of claim 9, wherein the plurality of portions of memory include written and unwritten portions of memory.

11. The non-transitory computer-readable storage medium of claim 9, wherein determining the memory identifier includes retrieving parity map data, wherein the parity map data indicates programmed portions of memory for each of the plurality of zones in the parity group, and wherein the processing device is further to:

determine updated parity map data using the parity map data, the zone, and the memory identifier; and store the updated parity map data.

12. The non-transitory computer-readable storage medium of claim 9, wherein the processing device is further to:

determine whether a fullness of the zone satisfies a threshold fullness; and in response to determining the fullness satisfies the threshold fullness:

replace the zone with a replacement zone;

determine replacement parity group data using the updated parity group data and the zone, wherein the replacement parity group data does not include parity data for the zone; and send the replacement parity data to the temporary parity buffer.

13. The non-transitory computer-readable storage medium of claim 12, wherein determining the replacement parity group data comprises:

generating zone parity data for all data stored in the zone; and generating the replacement parity group data by removing the zone parity data from the updated parity group data.

14. The non-transitory computer-readable storage medium of claim 9, wherein determining the updated parity group data comprises performing an exclusive-or operation using the parity group data and the user data.

15. The non-transitory computer-readable storage medium of claim 9, wherein the temporary parity buffer is a volatile memory element and wherein the processing device is further to:

detect a power loss event; and store the temporary parity buffer in a non-volatile memory element in response to detecting the power loss event.

16. The non-transitory computer-readable storage medium of claim 9, wherein the temporary parity buffer comprises a first type of memory element and a second type of memory element and wherein the processing device is further to:

determine a fill frequency for each zone in the plurality of zones;

determine a first set of zones and a second set of zones of the plurality of zones using the fill frequency;

allocate the first type of memory element to the first set of zones; and allocate the second type of memory element to the second set of zones.

17. A system comprising:

a plurality of memory devices; and a processing device, operatively coupled with the plurality of memory devices, to:

allocate a temporary parity buffer to a parity group, wherein the temporary parity buffer is allocated for written and unwritten portions of memory in the parity group;

receive a write command, wherein the write command includes user data and is directed to a portion of memory, wherein the portion of memory is included in a zone which is included in the parity group comprising a plurality of zones and each of the plurality of zones comprises a plurality of portions of memory;

determine a memory identifier for the portion of memory by retrieving parity map data, wherein the parity map data indicates programmed portions of memory for each of the plurality of zones in the parity group;

receive parity group data from the temporary parity buffer using the memory identifier, wherein the parity group data includes parity data for portions of memory of the plurality of zones identified by the memory identifier, wherein the portions of memory include written and unwritten portions of memory, and wherein a first zone of the plurality of zones has a first write rate and a first fill frequency, a second zone of the plurality of zones has a second write rate that is the same as the first write rate and a second fill frequency that is different from the first fill frequency;

determine updated parity group data using the parity group data and the user data;

send the updated parity group data to the temporary parity buffer;

determine updated parity map data using the parity map data, the zone, and the memory identifier; and store the updated parity map data.

18. The system of claim 17, wherein the processing device is further to:

determine whether a fullness of the zone satisfies a threshold fullness; and in response to determining the fullness satisfies the threshold fullness:

replace the zone with a replacement zone;

determine replacement parity group data using the updated parity group data and the zone, wherein the replacement parity group data does not include parity data for the zone; and send the replacement parity data to the temporary parity buffer.

19. The system of claim 18, wherein determining the replacement parity group data comprises:

generating zone parity data for all data stored in the zone; and generating the replacement parity group data by removing the zone parity data from the updated parity group data.

20. The system of claim 17, wherein the temporary parity buffer is a volatile memory element and wherein the processing device is further to:

detect a power loss event; and store the temporary parity buffer in a non-volatile memory element in response to detecting the power loss event.

* * * * *